(12) United States Patent
Abe et al.

(10) Patent No.: US 12,352,309 B2
(45) Date of Patent: Jul. 8, 2025

(54) CRANKSHAFT

(71) Applicants: NIPPON STEEL CORPORATION, Tokyo (JP); TOYOTA JIDOSHA KABUSHIKI KAISHA, Toyota (JP)

(72) Inventors: Tatsuhiko Abe, Tokyo (JP); Manabu Kubota, Tokyo (JP); Satoru Okawa, Tokyo (JP); Motoichi Murakami, Gotenba (JP); Takashi Koyama, Mishima (JP); Yusuke Morita, Mishima (JP); Takeshi Fukui, Aichi-ken (JP); Yusuke Inukai, Aichi-ken (JP); Yuichiro Kajiki, Aichi-ken (JP)

(73) Assignees: NIPPON STEEL CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 415 days.

(21) Appl. No.: 18/005,877

(22) PCT Filed: Sep. 24, 2021

(86) PCT No.: PCT/JP2021/035059
§ 371 (c)(1),
(2) Date: Jan. 18, 2023

(87) PCT Pub. No.: WO2022/065425
PCT Pub. Date: Mar. 31, 2022

(65) Prior Publication Data
US 2023/0304528 A1    Sep. 28, 2023

(30) Foreign Application Priority Data
Sep. 28, 2020   (JP) ................. 2020-162443

(51) Int. Cl.
| | | |
|---|---|---|
| *C22C 38/04* | (2006.01) | |
| *C22C 38/00* | (2006.01) | |
| *C22C 38/02* | (2006.01) | |
| *C22C 38/06* | (2006.01) | |
| *C22C 38/38* | (2006.01) | |
| *C22C 38/60* | (2006.01) | |
| *F16C 3/06* | (2006.01) | |
| *C21D 9/30* | (2006.01) | |

(52) U.S. Cl.
CPC ............ *F16C 3/06* (2013.01); *C22C 38/00* (2013.01); *C22C 38/02* (2013.01); *C22C 38/04* (2013.01); *C22C 38/06* (2013.01); *C22C 38/38* (2013.01); *C22C 38/60* (2013.01); *C21D 9/30* (2013.01)

(58) Field of Classification Search
CPC ..................................................... C22C 38/04
See application file for complete search history.

(56) References Cited

FOREIGN PATENT DOCUMENTS

| | | | | |
|---|---|---|---|---|
| EP | 1602742 A1 | * | 12/2005 | ............... C21D 9/30 |
| JP | 01303309 A | | 12/1989 | |
| JP | 07034134 A | | 2/1995 | |
| JP | 2006070328 A | | 3/2006 | |
| JP | 4332070 B2 | | 6/2009 | |
| JP | 2017110247 A | | 6/2017 | |
| WO | 2017056896 A1 | | 4/2017 | |

OTHER PUBLICATIONS

Human Written English Partial Translation of JP 2017-110247 A of Kubota by Translations Service Center of the Scientific and Technical Information Center (Year: 2017).*

* cited by examiner

*Primary Examiner* — Jophy S. Koshy
(74) *Attorney, Agent, or Firm* — Greer Burns & Crain Ltd.

(57) ABSTRACT

A crankshaft with improved seizure resistance is provided. A crankshaft (10) is a crankshaft including journals (11) and pins (12), having a chemical composition of, in mass %: 0.35 to 0.40% C; up to 0.70% Si; 1.00 to 2.00% Mn; up to 0.50% Cr; up to 0.050% Al; up to 0.020% N; up to 0.020% P; 0.005 to 0.200% S; and balance Fe and impurities, each of the journals (11) and pins (12) having a surface microstructure containing tempered martensite in not less than 80 volume % and a surface hardness not higher than HV 450.

6 Claims, 4 Drawing Sheets

CRANKSHAFT

TECHNICAL FIELD

The present invention relates to a crankshaft.

BACKGROUND ART

Some crankshafts are subjected to surface hardening by high frequency quenching or soft nitriding to improve fatigue strength and wear resistance.

JP Hei1(1989)-303309 A discloses a method of manufacturing a crankshaft including: separately producing a shaft, a bush, a flywheel, a pin and a web; welding them together to an integral product; quenching and tempering; and machining.

JP Hei7(1995)-34134 A discloses a method of surface-treating a crankshaft including: forming a crankshaft using a non-heat-treated steel with reduced carbon content, performing high-frequency quenching and tempering to achieve a hardness of HV 400 to below 500 after hardening; and performing surface plastic working such that the hardness of the surface-hardened layer is HV 500 to 700.

Japanese Patent No. 4332070 discloses a high-strength steel for a large forging and a large crankshaft made of such a steel. This publication states that the steel for a forging is to be heated to 870° C., cooled at a cooling rate of 20° C./min (quenching), and then tempered at 580 to 630° C.

WO 2017/56896 A1 discloses a roughly shaped crankshaft, a nitrided crankshaft and a method of manufacturing them. This publication describes quenching at a temperature not lower than the temperature 10° C. lower than the A3 point, and tempering at a temperature not lower than 550° C. and not higher than the A1 point.

PRIOR ART DOCUMENTS

Patent Documents

[Patent Document 1] JP Hei1(1989)-303309 A
[Patent Document 2] JP Hei7(1995)-34134 A
[Patent Document 3] Japanese Patent No. 4332070

SUMMARY OF THE INVENTION

Problems to be Solved by the Invention

A crankshaft is not only required to have fatigue strength and wear resistance, but also seizure resistance. In recent years, lubricating oils with lower viscosities and crankshafts with frictional portions constituted by thinner shafts have been developed to improve fuel efficiency; accordingly, even better seizure resistance is required of a crankshaft.

An object of the present invention is to provide a crankshaft with improved seizure resistance.

Means for Solving the Problems

A crankshaft according to embodiments of the present invention is a crankshaft including a journal and a pin, having a chemical composition of, in mass %: 0.35 to 0.40% C; up to 0.70% Si; 1.00 to 2.00% Mn; up to 0.50% Cr; up to 0.050% Al; up to 0.020% N; up to 0.020% P; 0.005 to 0.200% S; and balance Fe and impurities, where, for each of the journal and the pin, a microstructure of a surface contains tempered martensite in not less than 80 volume % and a hardness of the surface is not higher than HV 450.

Effects of the Invention

The present invention provides a crankshaft with improved seizure resistance.

EMBODIMENTS FOR CARRYING OUT THE INVENTION

Figure 1:
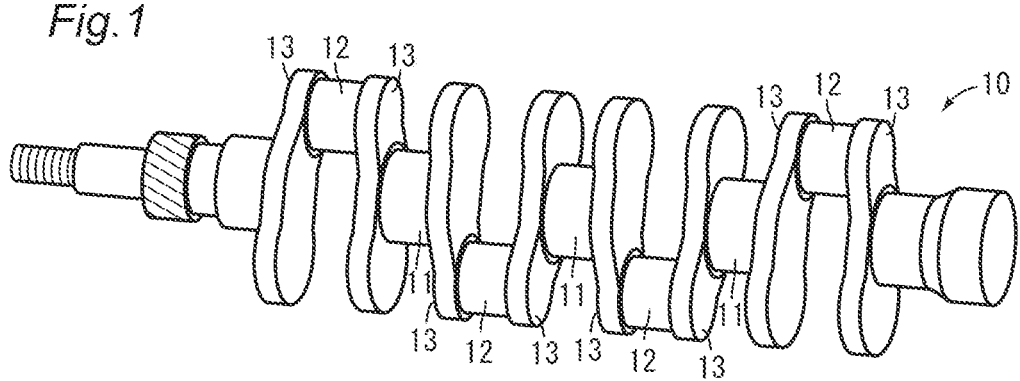
FIG. 1 is a schematic view of a crankshaft according to embodiments of the present invention.

To improve seizure resistance, it is said to be necessary to improve the surface hardness of the soft material of the sliding parts. In fact, some attempts have been made to improve the seizure resistance of a crankshaft by increasing the surface hardness of the bearing metal parts, which are made of soft material. Meanwhile, no systematic investigation has been conducted on the relationship between the seizure resistance and the surface hardness of the pins and journals of a crankshaft, which are made of hard material.

Generally, it is thought that increasing surface hardness improves wear resistance, and thus also improves seizure resistance. However, contrary to this expectation, an investigation by the present inventors has revealed that the lower the surface hardness of the pins and journals, the better the seizure resistance.

The present invention was made based on this finding. Now, embodiments of the present invention will be described in detail with reference to the drawings. The same or corresponding components in the drawings are labeled with the same reference numerals, and their description will not be repeated. The size ratios of the components shown in the drawings do not necessarily represent their actual size ratios.

[Crankshaft]

FIG. 1 is a schematic view of a crankshaft 10 according to embodiments of the present invention. The crankshaft 10 includes journals 11, pins 12, and arms 13.

The journals 11 are coupled to a cylinder block (not shown). The pins 12 are coupled to connecting rods (not shown). The arms 13 connect the journals 11 and pins 12. The journals 11 and pins 12 slide over the bearings provided on the cylinder block and connecting rods, respectively.

[Chemical Composition]

The crankshaft 10 has such a chemical composition as described below. In the description below, "%" for the content of an element means mass %.

C: 0.35 to 0.40%

Carbon (C) improves the hardness of steel, and thus contributes to an improvement in fatigue strength. On the other hand, an excessively high C content decreases quench-cracking resistance and machinability. In view of this, C content is to be 0.35 to 0.40%.

Si: up to 0.70%

Silicon (Si) deoxidizes steel. On the other hand, an excessively high Si content decreases machinability. In view of this, Si content is to be not higher than 0.70%. A lower limit for Si content is preferably 0.01%. An upper limit for Si content is preferably 0.50%.

Mn: 1.00 to 2.00%

Manganese (Mn) increases the hardenability of steel. On the other hand, an excessively high Mn content decreases machinability. In view of this, Mn content is to be 1.00 to 2.00%.

Cr: up to 0.50%

Chromium (Cr) increases the hardenability of steel. On the other hand, an excessively high Cr content decreases machinability. In view of this, Cr content is to be not higher than 0.50%. A lower limit for Cr content is preferably 0.01%, and more preferably 0.05%. An upper limit for Cr content is preferably 0.30%.

Al: up to 0.050%

Aluminum (Al) deoxidizes steel. On the other hand, an excessively high Al content decreases machinability. In view of this, Al content is to be not higher than 0.050%. A lower limit for Al content is preferably 0.001%.

N: up to 0.020%

Nitrogen (N) is an impurity. N decreases the hot ductility of steel. In view of this, N content is to be not higher than 0.020%. On the other hand, excessively limiting N content leads to increased refining costs. A lower limit for N content is preferably 0.001%, and more preferably 0.005%.

P: up to 0.020%

Phosphorus (P) is an impurity. P decreases the quench-cracking resistance of steel. In view of this, P content is to be not higher than 0.020%.

S: 0.005 to 0.200%

Sulfur(S) forms MnS and increases the machinability of steel. On the other hand, an excessively high S content decreases the hot workability of steel. In view of this, S content is to be 0.005 to 0.200%.

The balance of the chemical composition of the crankshaft 10 is Fe and impurities. Impurity as used here means an element originating from ore or scrap used as raw material for steel or an element that has entered from the environment or the like during the manufacturing process.

[Microstructure]

The journals 11, as well as the pins 12, have a surface microstructure containing tempered martensite in not less than 80 volume % and a surface hardness not higher than HV 450. As the surface microstructure of the journals 11 and pins 12 contains tempered martensite in not less than 80 volume % and the surface hardness is not higher than HV 450, seizure resistance will be significantly improved.

In specifying the surface microstructure of the journals 11 and pins 12, cementite will be treated as a structure independent from tempered martensite. The surface microstructure of the journals 11 and pins 12 preferably contains not less than 10 volume % cementite. The volume ratio of cementite in the surface microstructure of the journals 11 and pins 12 is preferably not lower than 12 volume %, and more preferably not lower than 15 volume %. Cementite is preferably dispersed in the form of fine grains.

The surface hardness of the journals 11 and pins 12 is measured in accordance with JIS Z 2244:2009. The testing force is 300 gf (2.942 N). The surface hardness of the journals 11 and pins 12 is preferably not higher than HV 400, more preferably not higher than HV 350, and yet more preferably not higher than HV 300, and still more preferably not higher than HV 250. Although no particular lower limit for the surface hardness of the journals 11 and pins 12 is specified, an example is HV 180, and a more preferable example is HV 200.

In both the journals 11 and the pins 12, the portions other than the surface may have any microstructure. That is, the journals 11 and pins 12 may have a microstructure containing tempered martensite in not less than 80 volume % all the way to the core, or only the microstructure of the surface or near-surface portions may contain tempered martensite in not less than 80 volume %.

Similarly, in both the journals 11 and the pins 12, the portions other than the surface may have any hardness. That is, the journals 11 and pins 12 may have a hardness not higher than HV 450 all the way to the core, or only the hardness of the surface or near-surface portions may be not higher than HV 450.

The sliding characteristics, such as seizure resistance, of a part are usually predominantly determined by the characteristics of the outermost portions of that part. Thus, the effect of improving seizure resistance will be produced if, in the journals 11 as well as pins 12, the microstructure of the outermost portions is such a microstructure as specified above and the hardness of the outermost portions is such a hardness as specified above. Still, to produce the effect more reliably, the journals 11 as well as pins 12 preferably have such a microstructure and hardness in a region from the surface down to the depth of 1.0 mm. More preferably, a region from the surface down to the depth of 2.0 mm has such a microstructure and such a hardness, and more preferably a region from the surface down to the depth of 3.0 mm has such a microstructure and such a hardness.

In the journals 11 as well as pins 12, the surface roughness Ra is preferably not higher than 0.100 μm. The surface roughness Ra of the journals 11 and pins 12 is more preferably not higher than 0.080 μm, and yet more preferably not higher than 0.060 μm.

Figure 2:
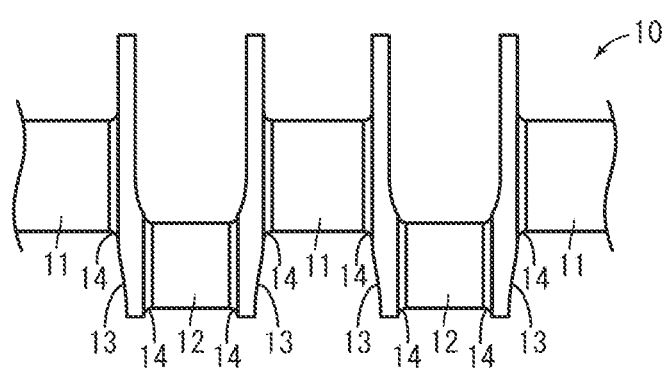
FIG. 2 is an enlarged view of some of the journals and pins.

FIG. 2 is an enlarged view of some of the journals 11 and pins 12 of the crankshaft 10. The crankshaft 10 further includes fillets 14, each provided at the border between a journal 11 and an adjacent arm 13 or at the border between a pin 12 and an adjacent arm 13. As used herein, both the fillets adjacent to the journals 11 and the fillets adjacent to the pins 12 will be referred to as fillets 14 without a distinction. A fillet 14 has a smooth shape to mitigate stress concentration.

The fillets 14 are the portions of the crankshaft 10 to which the greatest stresses are applied. The fatigue characteristics of the crankshaft 10 are predominantly determined by the fatigue strength of the fillets 14. Further, the bending fatigue of the crankshaft 10, which represents a major problem with the crankshaft, is predominantly determined by the characteristics of the outermost portions of the part. In view of this, to increase the fatigue strength of the crankshaft 10, it is preferable to increase the hardness of the outermost portions of the fillets 14.

More specifically, to increase the fatigue strength of the crankshaft 10, it is preferable that the hardness of the portions of a fillet 14 from the surface down to the depth of 2 mm is not lower than HV 580. The hardness of the portions of a fillet 14 from the surface down to the depth of 2 mm is more preferably not lower than HV 600, and more preferably not lower than HV 650. Although no particular upper limit for the hardness of the portions of a fillet 14 from the surface down to the depth of 2 mm in specified, an example is HV 800.

Even if the hardness of the fillets 14 is to be increased to improve the fatigue strength of the crankshaft 10, the region of a fillet 14 deeper than the depth of 2.0 mm from the surface may have any hardness. That is, the portions of a fillet 14 down to the core may have a hardness not lower than HV 580, or only the region from the surface down to the depth of 2 mm may have a hardness not lower than HV 580. Still, to produce the effect more reliably, it is more preferable that the region from the surface down to the depth of 3.0 mm has a hardness not lower than HV 580, not lower than HV 600, or not lower than HV 650, and it is yet more preferable that the region from the surface down to the depth of 4.0 mm has a hardness not lower than HV 580, not lower than HV 600, or not lower than HV 650.

The hardness of the fillets 14 is measured by taking a sample with a surface to be measured represented by a cross section parallel to the axis of the crankshaft 10 (i.e., longitudinal cross section), and measuring this surface in accordance with JIS Z 2244:2009. The testing force is 300 gf (2.942 N).

The fillets 14 may have any microstructure. However, if the hardness of the outermost portions of the fillets 14 is to be not lower than HV 580 for purposes such as improvement of the fatigue strength of the crankshaft 10, it is preferable that the microstructure of this region contains martensite. More specifically, the microstructure of the region preferably contains martensite in not less than 80 volume %. The volume ratio of martensite in that region is preferably not lower than 90 volume %, and more preferably not lower than 95 volume %.

As used herein, "martensite" (i.e., fresh martensite) means as-quenched martensite, or martensite that has been subjected to low-temperature tempering to remove strains, and is distinguished from "tempered martensite". "Martensite" and "tempered martensite" can be distinguished, for example, by microscopically observing the amount of precipitated metal carbides and cementite as well as how they are dispersed. Cementite is treated as a structure independent from martensite in specifying the microstructure of the outermost layer of the fillets 14.

The portions of the crankshaft other than the journals 11, pins 12 and fillets 14 (e.g., arms 13) may have any microstructure and hardness.

[Method of Manufacturing Crankshaft]

An exemplary method of manufacturing the crankshaft 10 will now be described. The manufacturing method described below is merely illustrative and by no means limits the method of manufacturing the crankshaft 10.

Figure 3:
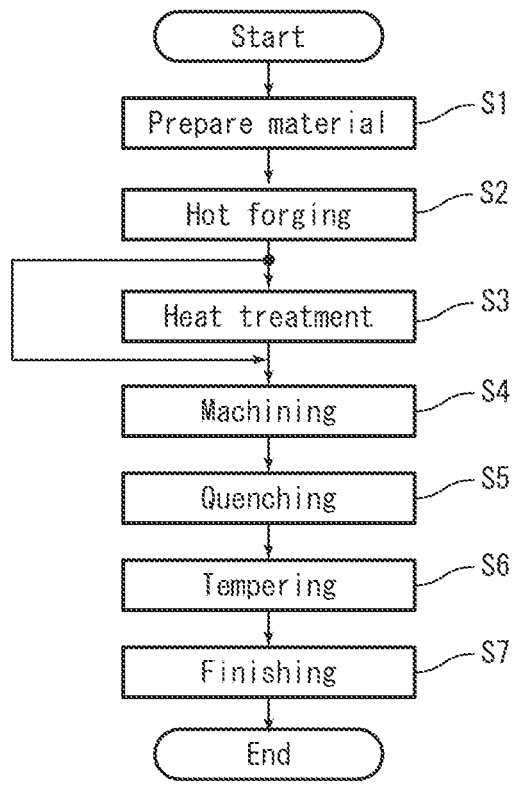
FIG. 3 is a flow chart illustrating en exemplary method of manufacturing the crankshaft of FIG. 1.

FIG. 3 is a flow chart illustrating an exemplary method of manufacturing the crankshaft 10. The manufacturing method includes the step of preparing a material (step S1), a hot forging step (step S2), a heat treatment step (step S3), a machining step (step S4), a quenching step (step S5), a tempering step (step S6), and a finishing step (step S7). These steps will now be described in detail.

A material for the crankshaft 10 is prepared (step S1). The material may be a steel bar, for example. The material may be produced by, for example, continuously casting or blooming a steel melt having a predetermined chemical composition.

The material is hot forged into a roughly shaped crankshaft (step S2). The hot forging process may be divided into rough forging and finish forging.

The roughly shaped crankshaft product produced by the hot forging may be subjected to a heat treatment, such as normalizing, as necessary (step S3). The heat treatment step (step S3) is optional and may be omitted depending on the crankshaft properties required or other factors.

The roughly shaped crankshaft product is machined (step S4). Machining processes include cutting, grinding and hole drilling. This step results in an intermediate product having a shape similar to that of the intended final product.

The machined intermediate crankshaft product is quenched (step S5). Specifically, the product is heated to a predetermined heating temperature and then rapidly cooled. This may be done by local heating using high-frequency induction heating equipment, or by heating the entire intermediate product in a heat-treat furnace. However, in the case of local heating, it is preferable that at least the journals 11, pins 12 and fillets 14 are heated. For this step, quenching may be performed in a plurality of separate rounds. The heating temperature is preferably not lower than the $Ac_3$ point, and more preferably not lower than 900° C.

At this step, the hardness of the outermost layers of the fillets 14 is preferably not lower than HV 580. The hardness of the outermost layers of the fillets 14 may be adjusted by adjusting the chemical composition of the material and/or the cooling rate during quenching. Specifically, the hardness of the outermost layers of the fillets 14 can be increased by increasing the contents of elements contributing to hardenability, such as C, or increasing cooling rate. If quenching is not enough for the hardness of the outermost layers of the fillets 14 to reach HV 580, plastic working, e.g. fillet rolling, may be performed to improve the hardness of the outermost layers of the fillets 14.

The intermediate product as quenched is tempered (step S6). Specifically, for example, the product is held at a temperature of 330 to 750° C. for a predetermined period of time. The tempering is performed in such a manner that the hardness of the surfaces of the journals 11 and pins 12 becomes not higher than HV 450. The higher the heating temperature or the longer the holding time, the lower the hardness will be. If the heating temperature is lower than 330° C., the hardness may not be sufficiently reduced. On the other hand, if the heating temperature is higher than 750° C., austenite may be produced in the microstructure. Since such austenite transforms into re-quenched martensite and/or ferrite/pearlite during cooling, the hardness may not be sufficiently reduced. The heating temperature is preferably 550 to 650° C. The holding time is 10 to 120 minutes, for example.

At this step, it is preferable to use high-frequency induction heating equipment to heat the journals 11 and pins 12 in order to prevent heating of the fillets 14 as much as possible. For this step, tempering may be performed in a plurality of separate rounds. This makes it possible to soften the journals 11 and pins 12 and not soften the fillets 14. The heating locations may be adjusted by adjusting the shape of the induction coil, the distance between the induction coil and the heated portions, the output frequency, and/or other parameters.

It will be understood that quenching and/or tempering may be performed a plurality of times, and that other heat treatments may be performed in addition to quenching and tempering. For example, to prevent quench cracking, a low-temperature tempering may be performed at a temperature that does not significantly affect the microstructure and hardness of the surface.

The intermediate product as tempered is subjected to finishing as necessary (step S7). For example, the journals 11 and pins 12 may be ground and/or lapped to adjust the surface shape. If finishing is performed, it is preferable to provide a surface roughness Ra of 0.040 to 0.100 μm.

An exemplary construction of a crankshaft 10 according to embodiments of the present invention and an exemplary method of manufacturing such a crankshaft have been described. These embodiments will provide a crankshaft with improved seizure resistance.

EXAMPLES

Now, the present invention will be described more specifically by means of examples. The present invention is not limited to these examples.

Steels having the chemical compositions shown in Table 1 were used as materials to fabricate test shafts for seizure testing, and the relationship between surface hardness and seizure resistance was investigated.

[Table 1]

TABLE 1

| | Chemical composition (in mass %, balance Fe and impurities) | | | | | | | |
|---|---|---|---|---|---|---|---|---|
| | C | Si | Mn | P | S | Cr | Al | N |
| Steel material A | 0.38 | 0.05 | 1.50 | 0.015 | 0.060 | 0.15 | 0.002 | 0.0175 |
| Steel material B | 0.38 | 0.50 | 1.50 | 0.015 | 0.060 | 0.15 | 0.002 | 0.0175 |

More specifically, material was heated to 1250° C. and then hot forged (with an end-of-forge temperature of 1075° C.) into a shaft with an outer diameter of 63 mm and a length of 570 mm. After the shaft was air-cooled to room temperature, it was trimmed and the scales thereon were removed. Thereafter, high-frequency quenching was performed in high-frequency induction heating equipment, where the shaft was heated to a temperature not lower than the $Ac_3$ point and then water-cooled. Frequency and other parameters were adjusted such that the thickness of the quench-hardened layer was not smaller than 3.0 mm. Then, tempering was performed where the shaft was heated at 620° C. or 350° C. for 90 minutes and then air-cooled. For finishing, the test shaft was ground and lapped such that the surface roughness Ra was 0.040 to 0.100 μm.

To provide comparative examples, test shafts were fabricated without tempering.

Figure 4:
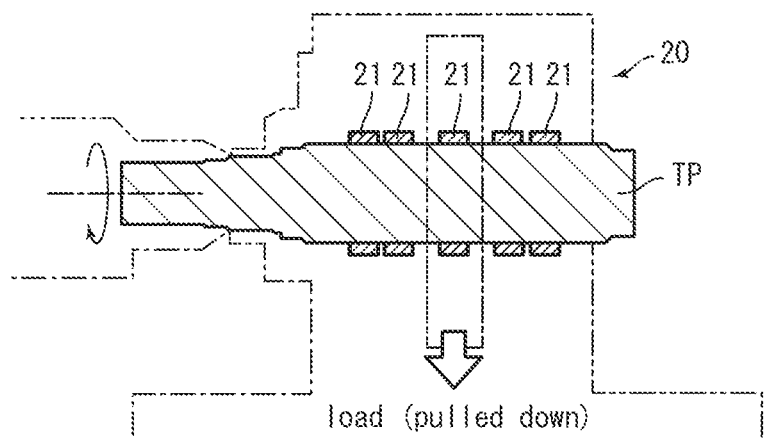
FIG. 4 is a schematic view of evaluation equipment used for seizure testing.

The resulting test shafts were used to conduct seizure testing. The seizure testing was conducted using a crank metal wear/seizure-resistance evaluator from Kobelco Machinery Engineering Co., Ltd. FIG. 4 shows a schematic view of the evaluator, 20. A test shaft TP was inserted through a plurality of bearings 21, and rotated by a motor (not shown) at 8000 rpm while the bearings 21 were supplied with oil. The metal part of a bearing was constituted by an engine bearing (of an Al alloy) from Taiho Kogyo Co., Ltd. The lubricating oil was 0W-16 or 0W-8, and the temperature of oil being supplied was 130° C.

Figure 5:
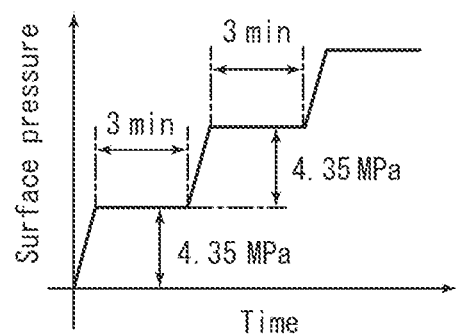
FIG. 5 schematically illustrates changes over time in the surface pressure applied to the test shafts.

In this state, one of the bearings 21 was lowered and the surface pressure applied to the test shaft TP was increased stepwise until seizure occurred. FIG. 5 schematically illustrates changes over time in the surface pressure applied to the test shaft TP. The time for which the surface pressure was held at one and the same level was 3 minutes, and the increase in surface pressure for each step was 4.0 MPa. It was determined that seizure had occurred when the surface temperature of the bearing was not lower than a prescribed value, or when the torque applied to the test shaft was not lower than a prescribed value.

The surface hardness, surface microstructure, surface roughness Ra, seizure surface pressure, tempering conditions, etc. of each of the test shafts are shown in Tables 2 and 3.

[Table 2]

TABLE 2

| | No. | Steel Material | Surface Hardness (HV) | Structure from Surface to 3 mm (vol. %) | Surface Ra (μm) | Seizure surface pressure (MPa) | Tempering Conditions | Lubricant |
|---|---|---|---|---|---|---|---|---|
| Inv. Ex. | 1 | A | 220 | tempered martensite (82%) | 0.057 | 101 | 620° C. × 90 min | 0W-16 |
| | 2 | A | 219 | tempered martensite (84%) | 0.050 | 109 | | |
| | 3 | A | 222 | tempered martensite (83%) | 0.060 | 81 | | |
| | 4 | A | 450 | tempered martensite (88%) | 0.077 | 89 | 350° C. × 90 min | 0W-16 |
| | 5 | A | 449 | tempered martensite (88%) | 0.061 | 89 | | |
| | 6 | A | 447 | tempered martensite (86%) | 0.057 | 105 | | 0W-8 |
| | 7 | A | 446 | tempered martensite (86%) | 0.052 | 101 | | |
| | 8 | A | 449 | tempered martensite (87%) | 0.058 | 97 | | |
| | 9 | A | 450 | tempered martensite (88%) | 0.060 | 93 | | |
| Comp. Ex. | 10 | A | 620 | martensite (98%) | 0.059 | 69 | n/a | 0W-16 |
| | 11 | A | 623 | martensite (98%) | 0.063 | 60 | | |
| | 12 | A | 624 | martensite (99%) | 0.070 | 56 | | |
| | 13 | A | 624 | martensite (99%) | 0.070 | 56 | | |
| | 14 | A | 621 | martensite (98%) | 0.058 | 65 | | 0W-8 |
| | 15 | A | 621 | martensite (98%) | 0.058 | 65 | | |
| | 16 | A | 619 | martensite (98%) | 0.064 | 60 | | |

TABLE 3

|  | No. | Steel Material | Surface Hardness (HV) | Structure from Surface to 3 mm (vol. %) | Surface Ra (μm) | Seizure surface pressure (MPa) | Tempering Conditions | Lubricant |
|---|---|---|---|---|---|---|---|---|
| Inv. Ex. | 21 | B | 220 | tempered martensite (82 %) | 0.059 | 85 | 620° C. × 90 min | 0W-16 |
|  | 22 | B | 219 | tempered martonsite (81 %) | 0.056 | 97 |  |  |
|  | 23 | B | 464 | Lompered martensite (89 %) | 0.078 | 73 | 350° C. × 90 min |  |
|  | 24 | B | 461 | tempered martensite (88 %) | 0.064 | 73 |  |  |
| Comp. Ex. | 25 | B | 622 | martensite (98 %) | 0.059 | 69 | n/a | 0W-16 |
|  | 26 | B | 623 | martensite (98 %) | 0.063 | 65 |  |  |
|  | 27 | B | 631 | martensite (99 %) | 0.070 | 52 |  |  |
|  | 28 | B | 624 | martensite (99 %) | 0.070 | 62 |  | 0W-8 |
|  | 29 | B | 633 | martensite (98 %) | 0.058 | 56 |  |  |

The column labeled "Structure from Surface to 3.0 mm (vol. %)" in each of Tables 2 and 3 shows the main structure (i.e., structure with the highest volume ratio) at a depth of 3.0 mm from the surface. A value in parentheses is the volume ratio of the relevant structure. Specifically, a cut surface parallel to the axis of the test shaft (i.e., longitudinal cross section) provided a surface to be observed, where a field of 36 μm by 48 μm at a depth of 3.0 mm from the surface was observed, and the area ratio in this cut surface was treated as the volume ratio. The microstructure in the surface of every one of the test shafts for Nos. 1 to 9 and Nos. 21 to 24 contained tempered martensite in not less than 80 volume %.

Figure 6:
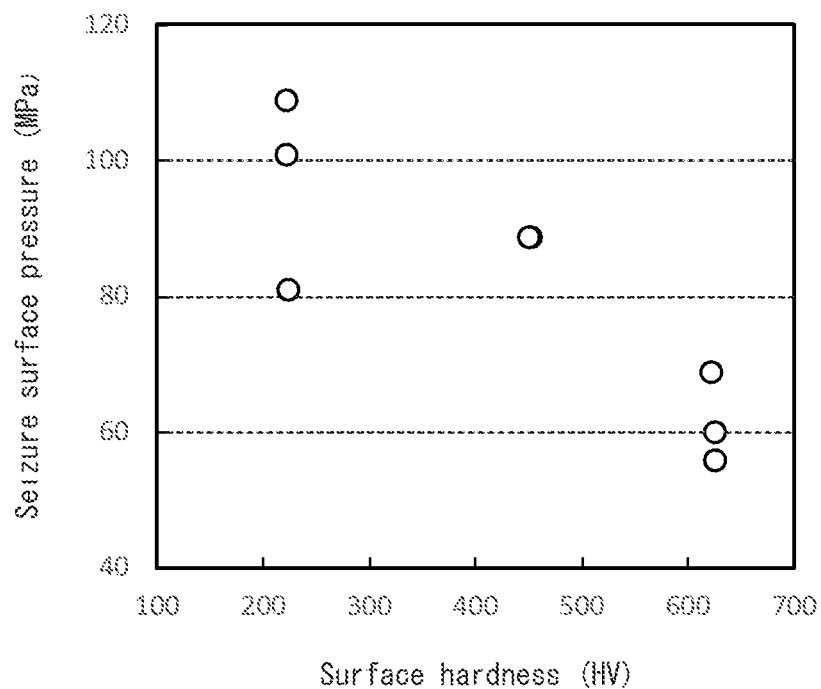
FIG. 6 is a graph illustrating the relationship between surface hardness and seizure surface pressure.
Figure 7:
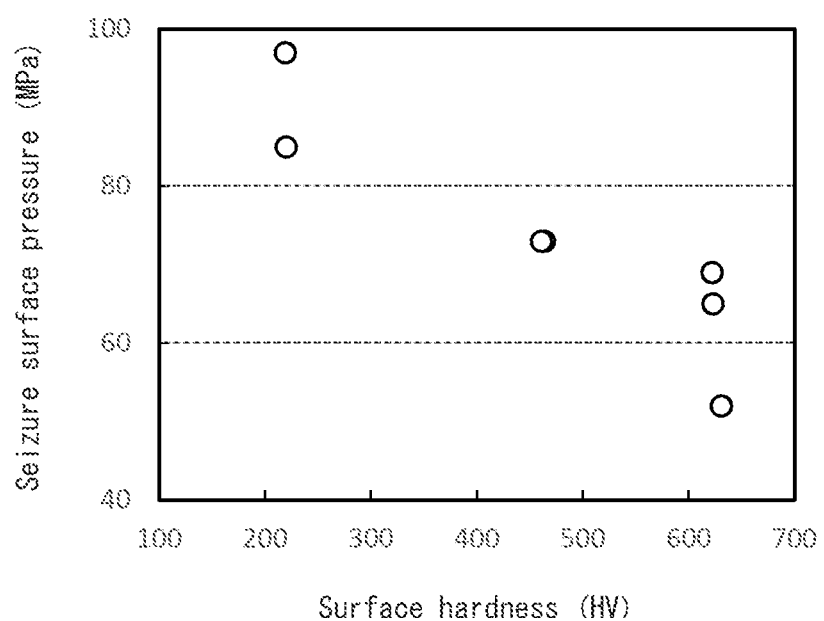
FIG. 7 is a graph illustrating the relationship between surface hardness and seizure surface pressure.

FIGS. 6 and 7 show the relationship between surface hardness and seizure surface pressure created from data with the 0W-16 lubricating oil. FIG. 6 relates to steel material A, while FIG. 7 relates to steel material B. As shown in FIGS. 6 and 7, test shafts with surface hardnesses not higher than HV 450 had higher seizure surface pressures than the test shafts for the comparative examples, exhibiting good seizure resistance. Further, there was observed a tendency that the lower the surface hardness, the higher the seizure surface pressure, although with variations.

Although embodiments of the present invention have been described, the above-described embodiments are merely illustrative examples useful for carrying out the present invention. Thus, the present invention is not limited to the above-described embodiments, and the above-described embodiments, when carried out, may be modified as appropriate without departing from the spirit of the invention.

REFERENCE SIGNS LIST

10: crankshaft
11: journals
12: pins
13: arms
14: fillets

The invention claimed is:

1. A crankshaft comprising a journal and a pin, the crankshaft having a chemical composition of, in mass %:
   0.35 to 0.40% C;
   up to 0.70% Si;
   1.00 to 2.00% Mn;
   up to 0.50% Cr;
   up to 0.050% Al;
   up to 0.020% N;
   up to 0.020% P;
   0.005 to 0.200% S; and
   balance Fe and impurities,
   for each of the journal and the pin, a microstructure of a surface containing tempered martensite in not less than 80 volume % and a hardness of the surface being not higher than HV 450.

2. The crankshaft according to claim 1, further comprising a fillet,
   wherein a hardness of the fillet from a surface down to a depth of 2.0 mm is not lower than HV 580.

3. The crankshaft according to claim 2, wherein a microstructure of the fillet from the surface down to the depth of 2.0 mm contains martensite in not less than 80 volume %.

4. The crankshaft according to claim 1, wherein the hardness of the surface of each of the journal and the pin is not higher than HV 250.

5. The crankshaft according to claim 1, wherein the microstructure of the surface of each of the journal and the pin further contains cementite in not less than 10 volume %.

6. The crankshaft according to claim 1, wherein a surface roughness Ra of each of the journal and the pin is not higher than 0.100 μm.

* * * * *